(12) United States Patent
Smith et al.

(10) Patent No.: US 9,467,296 B2
(45) Date of Patent: Oct. 11, 2016

(54) VIRALLY DISTRIBUTABLE TRUSTED MESSAGING

(71) Applicant: Intel Corporation, Santa Clara, CA (US)

(72) Inventors: Ned M. Smith, Beaverton, OR (US); William C. Deleeuw, Beaverton, OR (US); Thomas G. Willis, Portland, OR (US); Nathaniel J. Goss, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 14/473,308

(22) Filed: Aug. 29, 2014

(65) Prior Publication Data

US 2016/0065376 A1    Mar. 3, 2016

(51) Int. Cl.
*G06F 21/00* (2013.01)
*H04L 9/32* (2006.01)
(Continued)

(52) U.S. Cl.
CPC ............. *H04L 9/3247* (2013.01); *G06F 21/00* (2013.01); *H04L 63/0435* (2013.01); *H04L 63/0442* (2013.01); *H04L 63/061* (2013.01); *H04L 63/123* (2013.01); *H04L 9/0838* (2013.01)

(58) Field of Classification Search
USPC .................................................. 713/168–174
See application file for complete search history.

(56) References Cited

U.S. PATENT DOCUMENTS

| | | | | |
|---|---|---|---|---|
| 7,949,876 B2 * | 5/2011 | Haddad | ............... | H04L 63/1441 713/150 |
| 2014/0122884 A1 * | 5/2014 | Pieczul | ................... | G06F 21/00 713/171 |
| 2014/0136987 A1 | 5/2014 | Rodriguez | | |

OTHER PUBLICATIONS

Appleinsider.Com, "New Apple tech helps prevent misdirected messages and emails", retrieved on Oct. 31, 2014, 10 pages. Retrieved From: http://appleinsider.com/articles/14/05/15/new-apple-tech-helps-misdirected-text-messages.

(Continued)

*Primary Examiner* — Ghazal Shehni
(74) *Attorney, Agent, or Firm* — Barnes & Thornburg LLP

(57) ABSTRACT

Technologies for utilizing trusted messaging include a local computing device including a message client and a local trusted message module established in a trusted execution environment. The local trusted message module performs attestation of a remote computing device based on communication with a corresponding remote trusted message module established in a trusted execution environment of the remote computing device. The local trusted message module further exchanges, with the remote trusted message module, cryptographic keys in response to successful attestation of the remote computing device. The message client forwards outgoing messages to the local trusted message module and receives incoming messages from the local trusted message module. To securely transmit an outgoing message to the remote computing device, the local trusted message module receives the outgoing message from the message client, encrypts the outgoing message, and cryptographically signs the outgoing message, prior to transmittal to the remote trusted message module of the remote computing device. To securely receive an incoming message from the remote computing device, the local trusted message module receives the incoming message from the remote trusted message module of the remote computing device, decrypts the incoming message, and verifies a cryptographic signature of the incoming message, based on the exchanged cryptographic keys and prior to transmittal of the incoming message to the message client.

25 Claims, 8 Drawing Sheets

(51) Int. Cl.
*H04L 29/06* (2006.01)
*H04L 9/08* (2006.01)

(56) References Cited

OTHER PUBLICATIONS

Wikipedia, "Pretty Good Privacy", From Wikipedia, the free encyclopedia, retrieved on Oct. 31, 2014, 12 pages. Retrieved from: http://en.wikipedia.org/wiki/Pretty_Good_Privacy.

Wikipedia, "S/MIME", From Wikipedia, the free encyclopaedia, retrieved on Oct. 31, 2014, 4 pages. Retrieved from: http://en.wikipedia.org/wiki/S/MIME.

Home-Leap .Se, "LEAP Encryption Access Project", retrieved on Oct. 31, 2014, 5 pages. Retrieved from: https://leap.se/en/home.

Services-Leap .Se, "LEAP Encryption Access Project", retrieved on Oct. 31, 2014, 1 pages. Retrieved from: https://leap.se/en/services.

Leap.Se, "Email and its discontents—leap.se, LEAP Encryption Access Project", retrieved on Oct. 31, 2014, 4 pages. Retrieved from: https://leap.se/en/services/email.

C. Daboo, "CardDAV: vCard Extensions to Web Distributed Authoring and Versioning (WebDAV)", Internet Engineering Task Force (IETF), Request for Comments: 6352, ISSN: 2070-1721, Aug. 2011, 48 pages.

SQRL, "SQRL Secure Quick Reliable Login", retrieved on Oct. 31, 2014, 10 pages. Retrieved from: https://www.grc.com/sqrl/sqrl.htm.

J. Christopher Bare, "Attestation and Trusted Computing", CSEP 590: Practical Aspects of Modern Cryptography, Mar. 2006, 10 pages.

Hugo Krawczyk, "SIGMA: the 'SIGn-and-MAc' Approach to Authenticated Diffie-Hellman and its Use in the IKE Protocols", Jun. 12, 2003, 32 pages.

Ned M. Smith, "Privacy Enhanced Email Service", U.S. Appl. No. 14/314,652, filed Jun. 25, 2014, 34 pages.

* cited by examiner

VIRALLY DISTRIBUTABLE TRUSTED MESSAGING

BACKGROUND

Electronic communication such as email, text messaging, and instant messaging predominate how people privately communicate with one another on a day-to-day basis. Further, email and text messaging are regularly used to transmit highly confidential information such as website password reset information and information related to various accounts held by the user. In other words, those technologies have in some ways become the "root of trust" of the Internet. However, messages transmitted using, for example, email can be easily intercepted, modified, or replayed thereby making them very unsecure.

Various techniques have been employed to secure electronic messaging technologies such as email. However, many of those technologies are centralized and/or manual approaches to security management. That is, the technologies typically require the involvement of a third party or specific infrastructure and therefore have been slow to be adopted. For example, email signing such as Secure/Multipurpose Internet Mail Extensions (S/MIME) could be used to detect modifications to email content; however, internet-based S/MIME deployment is dependent on the Public Key Infrastructure (PKI), which does not extend easily to ordinary users and risks loss of privacy.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
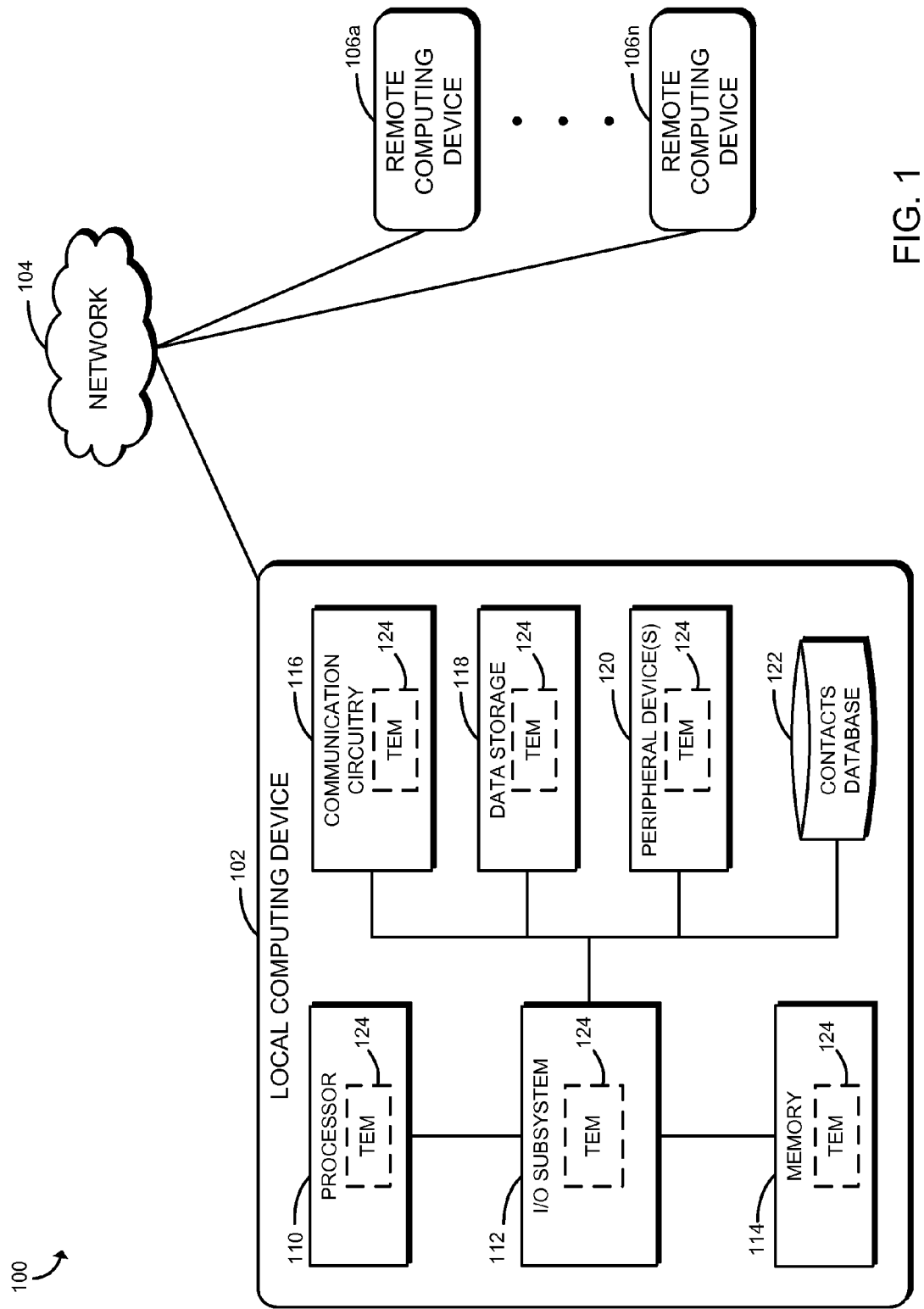
FIG. 1 is a simplified block diagram of at least one embodiment of a system for utilizing virally distributable trusted messaging.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for utilizing virally distributable messaging includes a local computing device 102, a network 104, and one or more remote computing devices 106. In use, as discussed in more detail below, the local computing device 102 may distribute trusted messaging technology to the remote computing devices 106, which in turn may further distribute the trusted messaging technology to other computing devices. In other words, the trusted message technology may be virally distributed by the local computing device 102 and/or the remote computing devices 106. Additionally, the local computing devices 102 leverages a message transport protocol, a message encoding, and cryptographic techniques to securely transmit and receive messages between a trusted message module of the local computing device 102 and a corresponding trusted message module of a remote computing device 106.

The local computing device 102 may be embodied as any type of computing device capable of establishing a communication link with the remote computing device(s) 106 and performing the functions described herein. For example, the local computing device 102 may be embodied as a desktop computer, server, laptop computer, tablet computer, notebook, netbook, Ultrabook™, cellular phone, smartphone, personal digital assistant, mobile Internet device, wearable computing device, Hybrid device, and/or any other computing/communication device. As shown in FIG. 1, the illustrative local computing device 102 includes a processor 110, an input/output ("I/O") subsystem 112, a memory 114, a communication circuitry 116, a data storage 118, one or more peripheral devices 120, and a contacts database 122. Additionally, in some embodiments, the local computing device 102 may include a trusted execution module 124. Of course, the local computing device 102 may include other or additional components, such as those commonly found in a typical computing device (e.g., various input/output devices and/or other components), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the local computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the local computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the local computing device 102, on a single integrated circuit chip.

The communication circuitry 116 of the local computing device 102 may be embodied as any communication circuitry, device, or collection thereof, capable of enabling communications between the local computing device 102 and other remote devices (e.g., the remote computing device 106). The communication circuitry 116 may be configured to use any one or more communication technology (e.g., wireless or wired communications) and associated protocols (e.g., Ethernet, Bluetooth®, Wi-Fi®, WiMAX, etc.) to effect such communication.

The data storage 118 may be embodied as any type of device or devices configured for short-term or long-term storage of data such as, for example, memory devices and circuits, memory cards, hard disk drives, solid-state drives, or other data storage devices. The data storage 118 and/or the memory 114 may store various data during operation of the local computing device 102 such as, for example, cryptographic keys, key certificates, and/or other data useful in the operation of the local computing device 102 as discussed below. Additionally, in some embodiments, the contacts database 122 of a portion thereof may be stored in the data storage 118.

In some embodiments, the local computing device 102 may also include one or more peripheral devices 120. The peripheral devices 120 may include any number of additional peripheral or interface devices, such as speakers, microphones, additional storage devices, and so forth. The particular devices included in the peripheral devices 120 may depend on, for example, the type and/or intended use of the local computing device 102.

As discussed below, the contacts database 122 stores contact information for contacts (i.e., persons, businesses, organizations, and/or other entities) of the user of the local computing device 102. Depending on the particular embodiment, the contact information may include, for example, the contact's name, physical address, message receiving address (e.g., email address, phone number, instant messaging moniker, internet protocol (IP) address, etc.), and/or other information related to the contact. The contacts database 122 may be any electronic arrangement of structure suitable for storing data related to the contacts. Of course, in some embodiments, the contacts database 122 may be embodied as a collection of databases or suitable data structures for storing contact information. Additionally, although the illustrative contacts database 122 is shown as being stored on the local computing device 102, in other embodiments, the contacts database 122 or a portion thereof may be stored remotely and accessible to the local computing device 102 (i.e., over the network 104).

The trusted execution module 124 is configured to establish a trusted execution environment (e.g., the trusted execution module 202 of FIG. 2) for secure execution of instructions. In some embodiments, the trusted execution module 124 includes a subset of resources of the local computing device 102. For example, as shown in FIG. 1, the processor 110, the I/O subsystem 112, the memory 114, the communication circuitry 116, the data storage 118, and/or the peripheral devices 120 may include a resource partition (e.g., a dedicated partition) for the trusted execution module 124. In other embodiments, the trusted execution module 124 may be embodied as a dedicated trusted compute engine that is, for example, embedded within the I/O subsystem 112 or otherwise communicatively coupled to the I/O subsystem 112. It should be appreciated that the trusted execution module 124 may be established as or otherwise utilize various technologies including, for example, Intel® Software Guard Extensions (SGX), Trusted Execution Engine (TEE), Trusted Platform Module (TPM), Intel® Converged Security Engine (CSE), ARM® TrustZone®, Intel® Manageability Engine, Intel® Chaabi Security Engine, and/or other techniques and mechanisms for establishing a secure and trusted execution environment.

The network 104 may be embodied as any type of communication network capable of facilitating communication between the local computing device 102 and remote devices (e.g., the remote computing devices 106). As such, the network 104 may include one or more networks, routers, switches, computers, and/or other intervening devices. For example, the network 104 may be embodied as, or otherwise include, one or more cellular networks, telephone networks, local or wide area networks, publicly available global networks (e.g., the Internet), ad hoc networks, or any combination thereof.

Each of the remote computing devices 106 may be embodied as any type of computing device capable of performing the functions described herein. For example, in some embodiments, the remote computing devices 106 may be similar to the local computing device 102 as described above. That is, each of the remote computing device 106 may be embodied as a desktop computer, server, laptop computer, tablet computer, notebook, netbook, Ultrabook™, cellular phone, smartphone, personal digital assistant, mobile Internet device, wearable computing device, Hybrid device, and/or any other computing/communication device. Further, the remote computing devices 106 may include components similar to those of the local computing device 102 discussed above. The description of those components of the local computing device 102 is equally applicable to the description of components of the remote computing devices 106 and is not repeated herein for clarity of the description. Further, it should be appreciated that any of the remote computing devices 106 may include other components, sub-components, and devices commonly found in a computing device, which are not discussed above in reference to the local computing device 102 and not discussed herein for clarity of the description.

Figure 2:
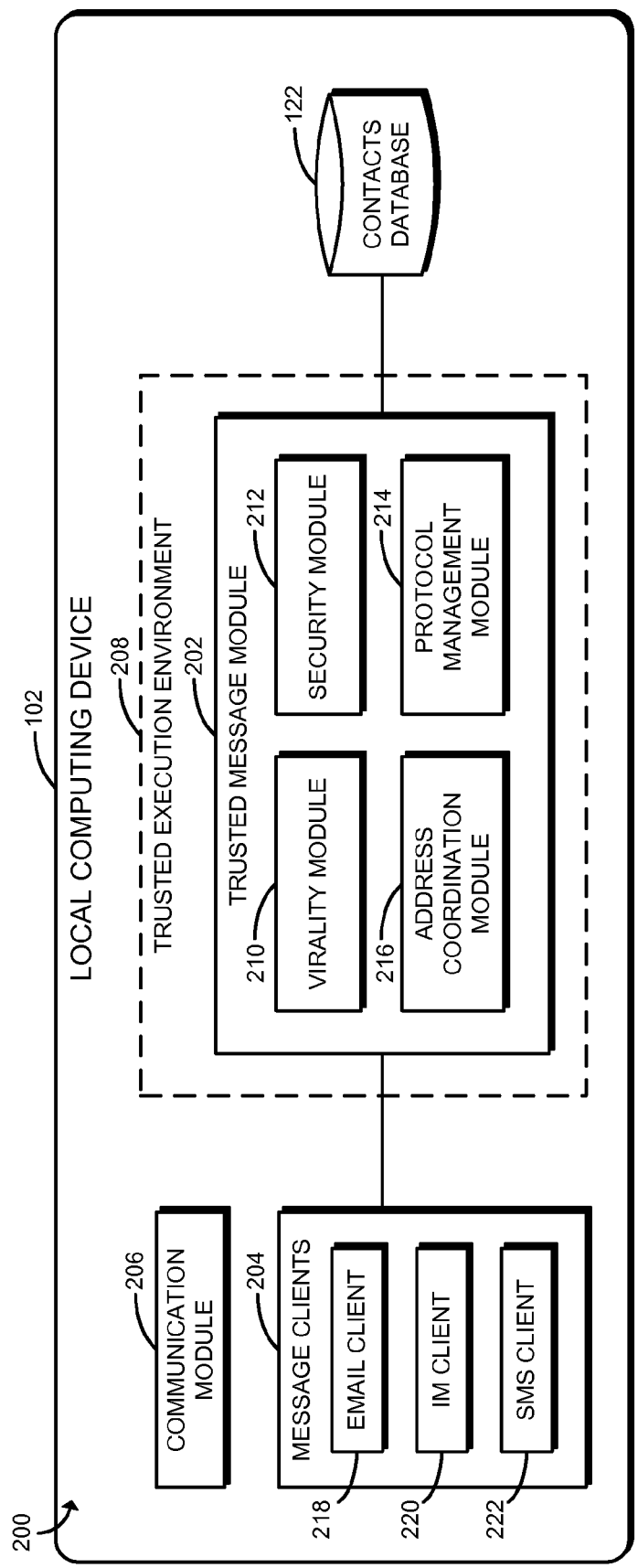
FIG. 2 is a simplified block diagram of at least one embodiment of an environment of a local computing device of the system of FIG. 1.

Referring now to FIG. 2, in use, the local computing device 102 establishes an environment 200 for utilizing virally distributable trusted messaging. The illustrative environment 200 includes a trusted message module 202, one or more message clients 204, and a communication module 206. As discussed below, in the illustrative embodiment, the trusted message module 202 is established in a trusted execution environment 208. Additionally, as shown, the trusted message module 202 includes a virality module 210, a security module 212, a protocol management module 214, and an address coordination module 216. Each of the modules of the environment 200 may be embodied as hardware, software, firmware, or a combination thereof. For example, each of the modules, logic, and other components of the environment 200 may form a portion of, or otherwise be established by, the processor 110 of the local computing device 102.

As discussed in more detail below, the trusted message module 202 may virally distribute trusted message technology to other users, perform various security-related functions (e.g., attestation and cryptography), leverage various messaging protocols and encodings for secure message transmission (e.g., to a counterpart trusted message module on a remote computing device 106), and/or modify the message receiving addresses of the local computing device 102 and/or the remote computing devices 106 depending on the particular embodiment. In some embodiments, the trusted message module 202 may be established in a trusted execution environment 208. That is, the trusted execution environment 208 may be established to ensure that the functions of the trusted message module 202 are performed in a secure and trusted environment. For example, in some embodiments, the trusted execution environment 208 may be established as a secure enclave using Intel® Software Guard Extensions (SGX) technology. In other embodiments, the trusted execution environment 208 may be established using, for example, a Trusted Execution Engine (TEE), Trusted Platform Module (TPM), Intel® Converged Security Engine (CSE), ARM® TrustZone® technology, and/or other techniques and mechanisms for establishing a secure and trusted execution environment. In the illustrative embodiment, as discussed below, the trusted message module 202 and/or other modules of the local computing device 102 may take "measurements" of the trusted execution environment 208 (e.g., attestation quotes) that may be used to determine the security of the trusted execution environment 208 and/or modules established in or executing in the trusted execution environment 208. Further, in some embodiments, the trusted execution environment 208 may be established in an isolated hardware component (e.g., a security co-processor).

As indicated above, the trusted message module 202 includes the virality module 210, the security module 212, the protocol management module 214, and the address coordination module 216. The virality module 210 handles the viral distribution of trusted messaging technology to the remote computing devices 106. In particular, as discussed below, the virality module 210 may construct and transmit a message to one or more users of the remote computing devices 106 requesting the users to install or otherwise enable trusted messaging technology (e.g., corresponding trusted message modules) on the remote computing devices 106. The request may include, for example, a link to download a trusted message module (e.g., a helper plugin/utility for "application store"-type installation) and/or instructions for installing/enabling the trusted message module. Depending on the particular embodiment, the virality module 210 may generate and transmit such messages in response to the occurrence of some condition or automatically. For example, in some embodiments, the local computing device 102 may receive a message from a remote computing device 106 in an unsecure form. Upon receipt, the virality module 210 may request the user of the sending remote computing device 106 to install or enable a remote trusted message module (e.g., in order to continue communication with the local computing device 102). In some embodiments, the virality module 210 may search the contacts database 122 of the local computing device 102 and transmit such messages to one or more of the contacts (e.g., all of them) identified in the contacts database 122 (e.g., based on a corresponding message address such as an email address). The virality module 210 may do so periodically, upon initial enablement of the trusted message module 202, when new contacts are identified, or according to other criteria. Accordingly, in some embodiments, the virality module 210 may maintain records indicating which of the remote computing devices 106 have enabled trusted message modules, which have been transmitted requests to enable trusted message modules, and/or other related information. It should be appreciated that the distribution of the trusted message technology is viral in the sense that, upon installation or enablement of a corresponding trusted message module on the remote computing devices 106, those devices 106 may further distribute the trusted message technology (e.g., based on their corresponding contacts databases) to other computing devices and so on with or without interaction of the user of the devices 106.

The security module 212 performs various security functions for the trusted message module 202 related to the secure transmission and receipt of messages. As indicated above, in the illustrative embodiment, the trusted message module 202 may run in a trusted execution environment 208. Accordingly, in such embodiments, the security module 212 may perform attestation of the local computing device 102 (e.g., to provide to a remote computing device 106) and evaluate an attestation measurement (e.g., an attestation quote) provided by a remote computing device 106. In some embodiments, the security module 212 may generate an attestation quote based on the trusted execution environment 208 of the local computing device 102. For example, the security module 212 may generate an SGX enclave quote, a TPM quote, and/or another type of trust quote based on the trusted execution environment 208 depending on the particular embodiment. In particular, in some embodiments, the security module 212 takes a measurement (e.g., a hash) of code executing (or for execution) in the trusted execution environment 208 to prove the integrity of the code executed in the trusted execution environment 208.

As indicated above, the security module 212 may also receive an attestation quote from a remote computing device 106 based on a corresponding trusted execution environment of the remote computing device 106 and verify that attestation quote. It should be appreciated that the security module 212 may utilize any suitable algorithms, techniques, and/or mechanisms for doing so. For example, in some embodiments, the security module 212 computes an attestation quote (e.g., a signed hash) of code executing in its own trusted execution environment 208 and compares that to the attestation quote provided by the remote computing device 106. Alternatively or additionally, the security module 212 may compare the received attestation quote to a whitelist embedded with the trusted message module 202 or otherwise accessible to the security module 212. In some embodiments, the security module 212 may utilize Intel® Sign-and-Mac (SIGMA) technology to perform attestation and Enhanced Privacy Identification (EPID) technology may be utilized to protect privacy (e.g., a SIGMA-EPID protocol may be employed for attestation and cryptographic purposes).

As described herein, the security module 212 is configured to perform various cryptographic functions to ensure secure and private communication between the trusted message module 202 and a corresponding trusted message module on the remote computing device 106. In some embodiments, the security module 212 may perform a cryptographic key exchange with a remote computing device 106. For example, the security module 212 may perform a Diffie-Hellman key exchange, and Elliptic Curve Diffie-Hellman key exchange, or another suitable cryptographic key exchange protocol with the remote computing device 106 (e.g., to generate session keys). As discussed below, the security module 212 generates a cryptographic key pair including a public key and a private key and transmits the public key to a corresponding trusted message module of a remote computing device 106 in exchange for a public key of the remote computing device 106. Although the techniques are described herein primarily with respect to asymmetric key pairs (i.e., public and private keys), it should be appreciated that suitable symmetric cryptographic algorithm(s) may be utilized to generate symmetric cryptographic keys in other embodiments. In such embodiments, the symmetric cryptographic keys may be exchanged with the remote computing device 106, in addition or alternatively to, asymmetric cryptographic keys as described herein. Further, in some embodiments, the cryptographic keys may be tiered such that a "top-level" relationship key may be periodically used to protect "temporal" keys that are used for some predetermined period of time before being refreshed, and the temporal keys may be transmitted under protection of the top level relationship key. By generating separate cryptographic keys for communication with each remote computing device 106, communication with a trusted third party for security verification is obviated.

It should further be appreciated that the security module 212 may generate various cryptographic keys for encryption of data and for cryptographically signing data transmitted to remote computing devices 106 (e.g., messages). For example, the security module 212 may sign messages using the private key of a cryptographic key pair generated for communication with a particular remote computing device 106. It should be appreciated that the particular cryptographic keys may be generated and/or utilized based on any suitable algorithm such as, for example, Rivest-Shamir-Adleman (RSA), Elliptic Curve Cryptography (ECC), Digital Signature Algorithm (DSA), or ElGamal. Although the discussed herein is primarily directed to encryption and signatures based on asymmetric encryption, it should be further appreciated that symmetric encryption may be utilized in various embodiments. For example, in some embodiments, data itself may be symmetrically encrypted, whereas the symmetric encryption key may then be encrypted with an asymmetric key and transmitted with the encrypted data. In other embodiments, only symmetric encryption keys are utilized for secure communication between the local computing device 102 and the remote computing device 106. In some embodiments, such as those in which symmetric encryption is utilized, authenticated encryption may be used to establish authenticity instead of, or in addition to, signature authentication using asymmetric cryptographic keys. Some such authenticated encryption algorithms include, for example, Galois/Counter Mode (GCM), Offset Codebook Mode (OCB), Counter with Cipher Block Chaining Message Authentication Code (CCM), Encrypt-then-MAC (EtM), and/or other authenticated encryption schemes. It should further be appreciated that the messages received and/or transmitted may be compound objects (e.g., including text, attachments, and/or other data structures). Accordingly, in some embodiments, prior to signing and/or encrypting, compound messages may be consolidated into a single object to be signed and/or encrypted. In other embodiments, one or more of the objects may be signed/encrypted separately. Further, the messages may also be compressed prior to signature and encryption. Additionally, in some embodiments, the security module 212 may require proof of user presence in which case the security module 212 may utilize, for example, Secure Quick Reliable Login (SQRL) and/or otherwise prompt the user to provide proof of presence (e.g., by entering a PIN or scan a QR code). Further, in some embodiments, the security module 212 may generate cryptographic key certificates for transmission to the remote computing devices 106.

The protocol management module 214 is configured to leverage various message transport protocols and message encodings to securely transmit messages to a corresponding trusted message module of a remote computing device 106 (e.g., in cooperation with the communication module 206). For example, as shown in FIG. 2, the environment 200 may include one or more message clients 204 for managing communication between the local computing device 102 and the remote computing devices 106. In particular, the message clients 204 may include an email client 218 (e.g., using Post Office Protocol (POP) or Internet Message Access Protocol (IMAP)), an instant messaging client 220, and/or a text messaging client 222 (e.g., using a Short Message Service (SMS)). As such, in some embodiments, the trusted message module 202 may be configured to securely communicate messages via email, instant messaging, and/or text messaging. In some embodiments, the instant messaging client 220 is configured to handle internet relay chat (IRC) communication (e.g., peer-to-peer IRC) and/or communication over other instant messaging protocols.

In the illustrative embodiment, in order to permit secure email communication, the protocol management module 214 may leverage MIME extensibility mechanisms for message frame exchange and implements Simple Mail Transfer Protocol (SMTP) and Internet Message Access Protocol (IMAP) services. For example, the protocol management module 214 ensures that email messages are tunneled via the SMTP outer protocol as MIME types and/or as American Standard Code for Information Interchange (ANSCII) encoded blobs. The protocol management module 214 similarly ensures that the trusted message module 202 "piggybacks" the appropriate protocols and utilizes the appropriate encoding when transmitting and receiving instant messages and text messages. Of course, it should be appreciated that there may be limitations over frame size and other constraints depending on the particular messaging protocol (e.g., email messaging versus text messaging). Further, the protocol management module 214 ensures that the messages are transmitted between the trusted message module 202 and the appropriate message client 204 depending on the type of the message (e.g., email, text message, instant message, etc.). It should further be appreciated that various other architectures may be employed to handle secure communication as described herein. For example, although the trusted message module 202 is described as being able to handle the communication using various message clients 204, in some embodiments, the local computing device 102 may include a different trusted message module 202 for each message client 204 (e.g., a separate trusted message module 202 for the email client 218 than the instant messaging client 220).

The address coordination module 216 permits the trusted message module 202 to modify the message receiving address of the remote computing devices 106 for subsequent communication with the remote computing devices 106. For example, one of the remote computing devices 106 may desire to be communicated with through a different message address (e.g., email address) than the address through which the trusted message module 202 initially communicated with the remote computing device 106 (e.g., a private message address). In those circumstances, the address coordination module 216 may update the contacts database 122 and/or other records with the new contact information. It should be appreciated that, in some embodiments, those changes may be isolated from the corresponding message client 204. For example, in such embodiments, a user may still construct a message to the user of the remote computing device 106 using the old message address, and the address coordination module 216 will modify the message header prior to secure transmission to ensure that it is directed to the updated address. The address coordination module 216 may similarly modify an address at which it desires to receive messages from a particular remote computing device 106. Accordingly, in some embodiments, the address coordination module 216 is configured to generate a new private message address at which to receive messages and notify the remote computing device 106 to use the private message address for subsequent communication. Messages received at that private message address may subsequently be forwarded to the appropriate message client (e.g., if the sender is authorized to use the private message address of the local computing device 102).

The communication module 206 handles the communication between the local computing device 102 and remote computing devices (e.g., the remote computing devices 106) through the network 104. As discussed in detail herein, the communication module 206 is configured to facilitate secure communication between the trusted message module 202 and corresponding trusted message modules of the remote computing devices 106. Accordingly, the communication module 206 is configured to transmit/receive various cryptographic keys and encrypted communications to/from the remote computing devices 106.

Figure 3:
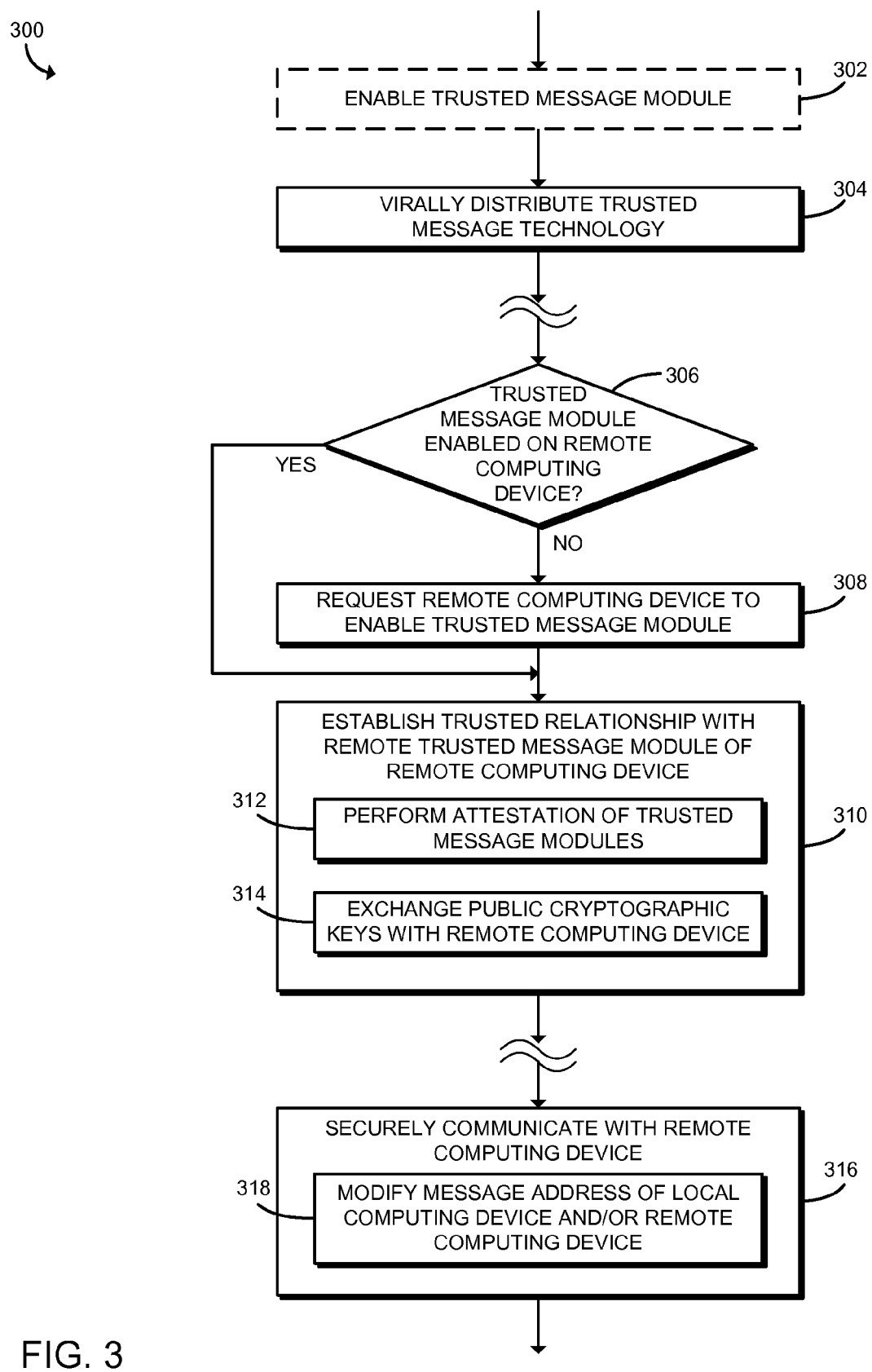
FIG. 3 is a simplified flow diagram of at least one embodiment of a method of utilizing virally distributable trusted messaging by the local computing device of the system of FIG. 1.

Referring now to FIG. 3, in use, the local computing device 102 may execute a method 300 for utilizing virally distributable trusted messaging. As indicated above, the local computing device 102 may virally distribute trusted messaging technology (e.g., the trusted message module 202) to remote computing devices 106, establish a trusted digital relationship with the remote computing devices 106 (e.g., via attestation and cryptographic encryption/signatures), securely communicate with remote computing devices 106 through their corresponding trusted message modules, and/or modify various message addresses of the computing devices 102, 106 depending on the particular embodiment. It should be appreciated that, in other embodiments, the features described herein may occur in a different order than that presented herein. For example, the viral distribution features and/or message address modification of the method 300 may occur in a different order or not at all in some embodiments.

The illustrative method 300 begins with block 302 in which the local computing device 102 may enable the trusted message module 202 if it has not done so already. For example, in some embodiments, the local computing device 102 may have received a request from a remote computing device 106 to install or otherwise enable the trusted message module 202. In other embodiments, the trusted message module 202 may be enabled upon boot of the local computing device 102 or persistently enabled. It should be appreciated that, in the illustrative embodiment, the trusted message module 202 of the local computing device 102 executes the method 300 after being enabled (i.e., if not already enabled). In block 304, the local computing device 102 may virally distribute the trusted message technology. In other words, the local computing device 102 may solicit other computing devices (e.g., the remote computing devices 106) to install or otherwise enable a corresponding trusted message module.

Figure 4:
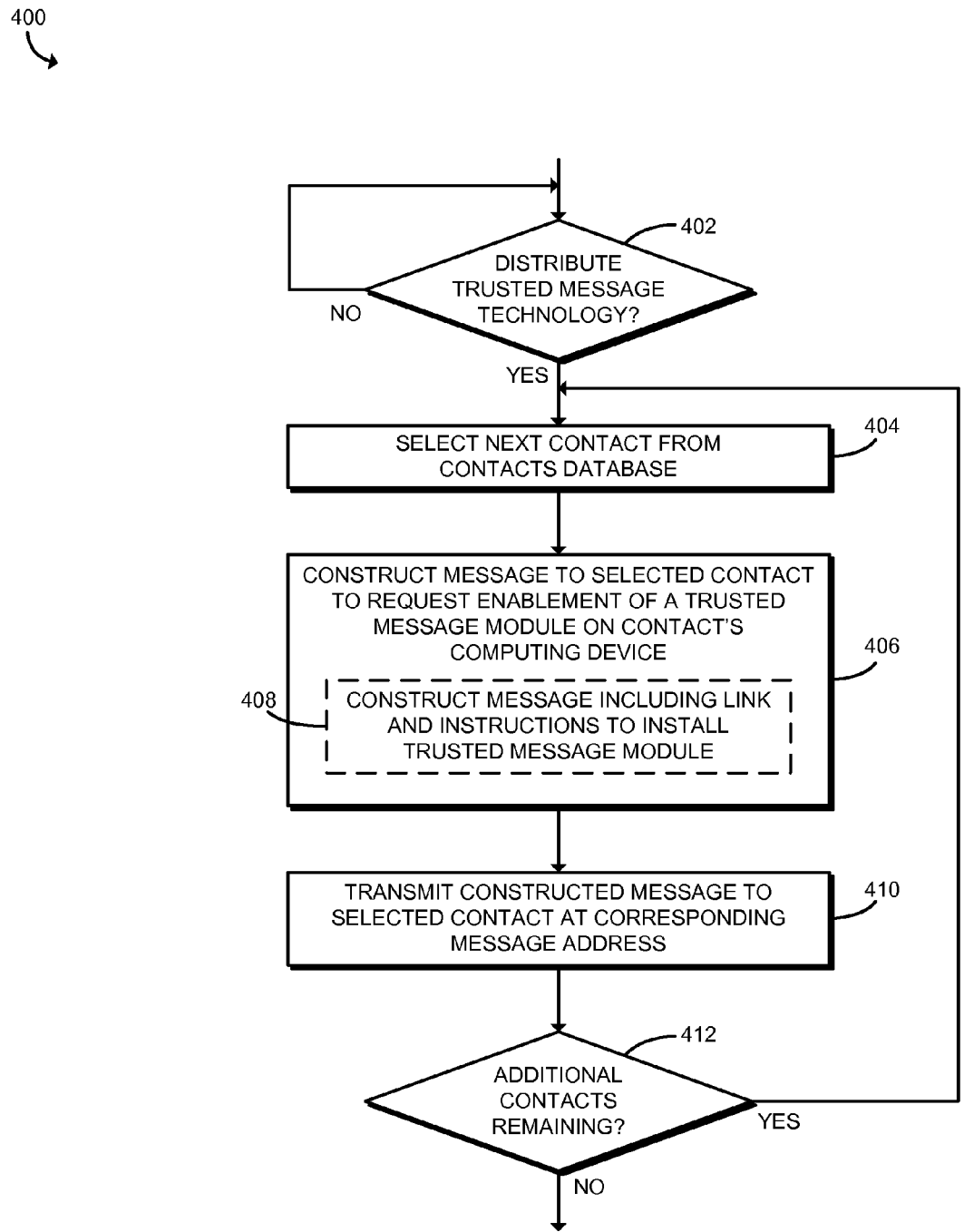
FIG. 4 is a simplified flow diagram of at least one embodiment of a method of virally distributing trusted message technology by the local computing device of the system of FIG. 1.

To do so, the local computing device 102 may execute a method 400 as described in FIG. 4. More specifically, in the illustrative embodiment, the method 400 is executed by the trusted message module 202 of the local computing device 102. The method 400 begins with block 402 in which the local computing device 102 determines whether to distribute the trusted message technology. If so, the local computing device 102 selects the "next" contact from the contacts database 122. As discussed above, in the illustrative embodiment, the contacts database 122 includes a set of contact persons and/or entities known to the user of the local computing device 102 and the corresponding message addresses of those persons. In the illustrative embodiment, the local computing device 102 selects a contact and identifies an email address associated with the contact. In other embodiments, the local computing device 102 may identify a message address associated with a different message client 204 and perform the functions described herein. It should be appreciated that the contact constituting the "next" contact may vary depending on the particular embodiment. In the illustrative embodiment, the next contact is any contact to which the local computing device 102 has not already transmitted a message soliciting enablement of a trusted message module. In some embodiments, the user of the local computing device 102 may select specific contacts to which to distribute the trusted message technology (e.g., those with which the user wants to securely communicate under cryptographic protection).

In block 406, the local computing device 102 constructs a message to the selected contact to request enablement of a trusted message module on the contact's corresponding computing device. In doing so, in block 408, the local computing device 102 may include a link and instructions to install the trusted message module. For example, the invitation message or request may include a link to a helper plugin/utility that allows the remote user to easily install a trusted message module (e.g., replicating an "application store" installation environment). In some embodiments, the message may also indicate that the user of the local computing device 102 is unwilling to continue communication with the remote user unless the remote user installs the trusted message module for secure communication. In block 410, the local computing device 102 transmits the constructed message to the selected contact at the corresponding message address of the contact so that the remote user may install or otherwise enable the trusted message module for secure communication. It should be appreciated that, in some embodiments, the invitation message may include the first portion of the key exchange protocol described herein. For example, the local computing device 102 may generate a cryptographic key pair for use with the remote computing device 106 of the selected contact and transmit the public key of the cryptographic key pair to the remote computing device 106 with the invitation. If the user of the remote computing device 106 determines to install/enable the trusted message technology, the remote computing device 106 may generate its own cryptographic key pair and transmit that public cryptographic key to the local computing device 102 as described below.

In block 412, the local computing device 102 determines whether there are any additional contacts remaining in the contacts database 122 to which to transmit an invitation message or otherwise solicit installation/enablement of the trusted message module. As indicated above, in some embodiments, the local computing device 102 maintains a record of the remote computing devices 106 and/or contacts that have already enabled the trusted message module. In some embodiments, the record may also include information regarding the current state of the key exchange including, for example, intermediate results of the key exchange, notations to recall the state of the key exchange, and/or other information relevant to the key exchange. By doing so, the local computing device 102 is able to determine which remote computing devices 106 are ready for secure communication and/or which remote computing device 106 to avoid soliciting for installation of the trusted messaging technology. If there are contacts remaining in the contacts database 122 that have not already been requested to enable the trusted message module, the method 400 returns to block 404 in which the local computing device 102 selects the next contact from the contacts database 122. As indicated above, in some embodiments, the local computing device 102 periodically may determine to virally distribute the trusted message technology or may monitor the contacts database 122 to identify newly added contacts to send invitation messages to. In some embodiments, the user of the local computing device 102 may also manually determine to request installation/enablement of the trusted messaging technology from a particular contact. For example, the user may transmit an invitation to herself so that she may install the trusted message module on a different computing device.

Referring back to FIG. 3, in block 306, the local computing device 102 determines whether the trusted message module is enabled on a remote computing device 106. For example, the trusted message module 202 may want to establish a trusted relationship between the trusted message module 202 of the local computing device 102 and a corresponding trusted message module of the remote computing device 106. In another embodiment, the local computing device 102 may have received a message from one of the message clients 204 and may need to determine whether a corresponding trusted message module exists in which to transmit the message. Alternatively, the inquiry may have been prompted by the local computing device 102 having received a message from a remote computing device 106 in an unsecure manner (e.g., solely through the message client 204). In any case, if the local computing device 102 determines that a trusted message module is not enabled on the remote computing device 106, the local computing device 102 may request the remote computing device 106 to install or otherwise enable a trusted message module as described above.

In block 310, the local computing device 102 establishes a trusted relationship with the trusted message module of the remote computing device 106. More specifically, the trusted message module 202 of the local computing device 102 (i.e., the local trusted message module) establishes a trusted relationship with the corresponding trusted message module of the remote computing device 106 (i.e., the remote trusted message module). To do so, in the illustrative embodiment, the local computing device 102 may perform attestation of the trusted message modules in block 312 (see FIG. 5) and exchange public cryptographic keys with the remote computing device 106 in block 314 (see FIG. 6). In other embodiments, the local computing device 102 may employ other techniques to establish a trusted relationship between the corresponding trusted message modules.

Figure 5:
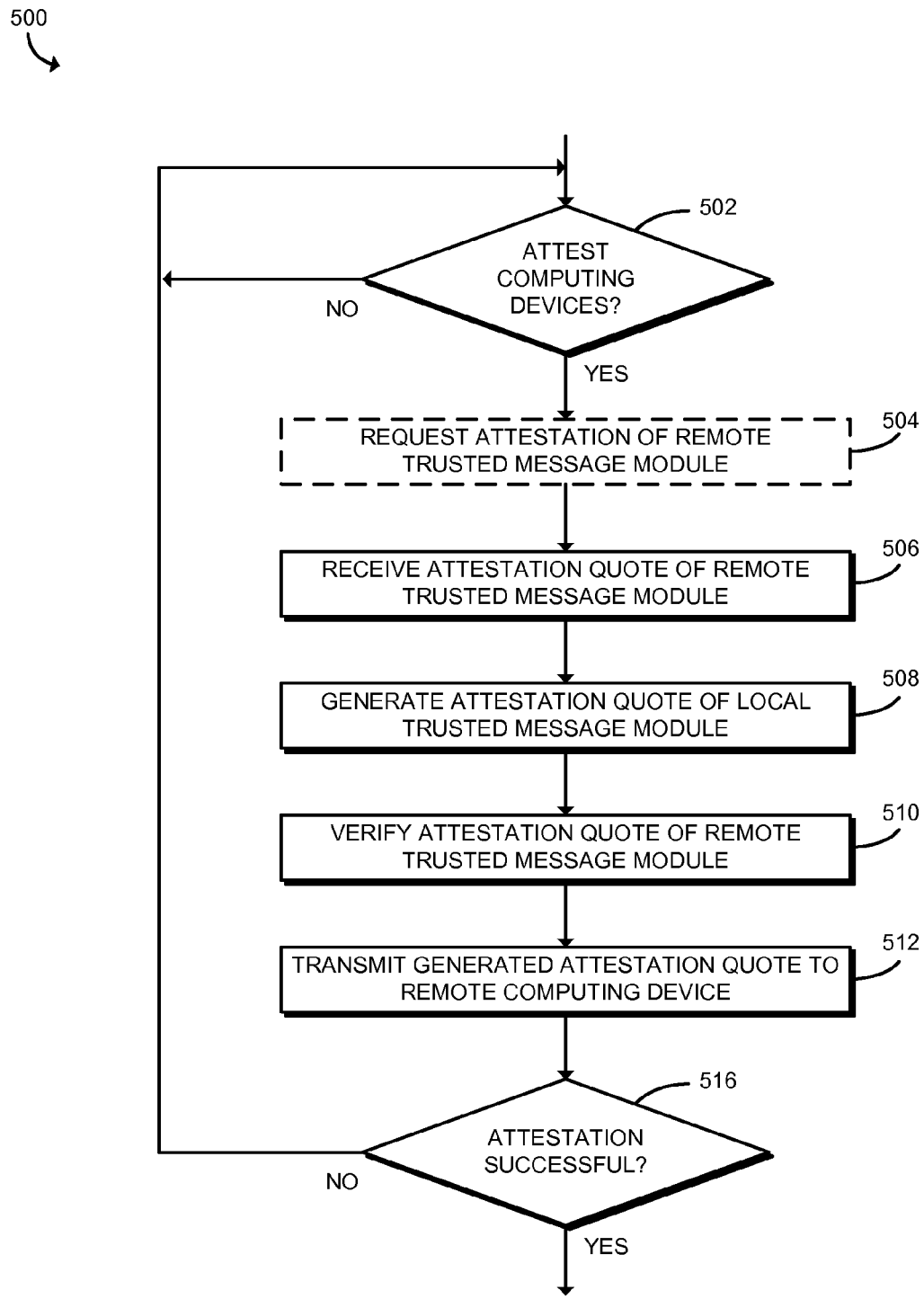
FIG. 5 is a simplified flow diagram of at least one embodiment of a method of performing attestation by the local computing device of the system of FIG. 1.

To perform attestation of the trusted message modules, the local computing device 102 may execute a method 500 as shown in FIG. 5. In some embodiments, the trusted message module 202 is attested by comparing a whitelist of known good images of the trusted message module 202 to the actual image of the trusted message module 202 using a cryptographic hash algorithm and/or other suitable encoding scheme. It should be appreciated that the whitelist image technique is unbending against a man-in-the-middle attack to, for example, modify email addresses and re-route messages to other non-participants in the digital relationship (i.e., devices other than the local computing device 102 and the remote computing device 106). As discussed above, in the illustrative embodiment, the trusted message module 202 of the local computing device 102 in particular executes the method 500. The illustrative method 500 begins with block 502 in which the local computing device 102 determines whether to attest the local computing device 102 and the remote computing device 106. If so, in block 304, the local computing device 102 may transmit a message to the remote computing device 106 requesting that the remote computing device 106 perform attestation. As discussed above, in some embodiments, the attestation may be accomplished using Intel® SIGMA technology and EPID. In the illustrative embodiment, the remote computing device 106 generates an attestation quote of the remote trusted message module and/or the trusted execution environment within which code associated with the remote trusted message module is executing. As discussed above, the remote computing device 106 may generate an SGX enclave quote, a TPM quote, and/or another type of trust quote based on the trusted execution environment of the remote computing device 106 depending on the particular embodiment. In doing so, the remote computing device 106 may take a measurement (e.g., a signed hash) of code executing (or for execution) in its trusted execution environment In block 506, the local computing device 102 receives the attestation quote from the remote computing device 106. In block 508, the local computing device 102 generates an attestation quote of the local computing device 102 in order to attest its integrity to the remote computing device 106. In the illustrative embodiment, the attestation quote of the local computing device 102 may be generated in a manner similar to that of the remote computing device 106 as described above. In block 510, the local computing device 102 verifies the attestation quote of the remote computing device 106. It should be appreciated that the local computing device 102 may do so utilizing any suitable techniques, algorithms, and/or mechanisms. For example, in some embodiments, the local computing device 102 compares the attestation quote generated based on its own trusted execution environment 208 to the remote attestation quote received from the remote computing device 106 to determine whether they match (i.e., whether the code executing or to be executed is the same in the respects determined to be important by the attestation algorithm). In some embodiments, the local computing device 102 compares the remote attestation quote to a whitelist stored on the local computing device 102 to determine whether the remote trusted message module is authentic.

In block 512, the local computing device 102 transmits the generated attestation quote of the local trusted message module 202 and/or the trusted execution environment 208 to the remote computing device 106 for verification by the remote computing device 106. In block 516, the local computing device 102 determines whether attestation of the local computing device 102 and the remote computing device 106 was successful. If not, the method 500 may return to block 502 in which the local computing device 102 reattempts to attest the computing devices 102, 106.

Figure 6:
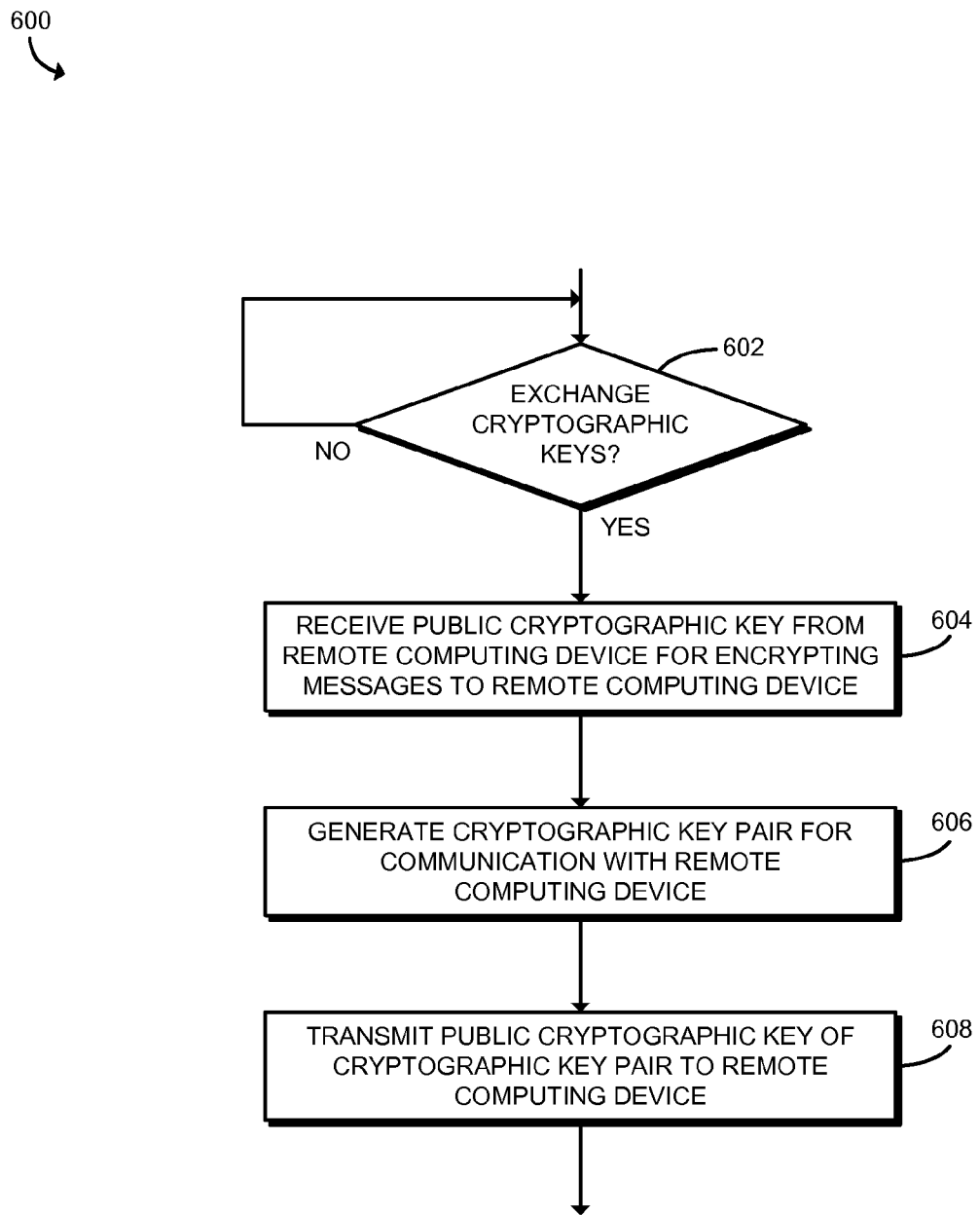
FIG. 6 is a simplified flow diagram of at least one embodiment of a method of exchanging cryptographic keys by the local computing device of the system of FIG. 1.

To exchange cryptographic keys, the local computing device 102 may execute the method 600 of FIG. 6. As discussed above, in the illustrative embodiment, the trusted message module 202 of the local computing device 102 executes the method 600. The illustrative method 600 begins with block 602 in which the local computing device 102 determines whether to exchange cryptographic keys. If so, in block 604, the local computing device 102 receives a public cryptographic key from the remote computing device 106 for encrypting messages transmitted to the remote computing device 106. Additionally, as discussed above, the public cryptographic key may also be used to verify the signature of messages received from the remote computing device 106. As such, in some embodiments, the same public cryptographic key may serve dual purposes. It should be appreciated that, in some embodiments, the remote computing device 106 may generate a cryptographic key pair including the public cryptographic key transmitted and a corresponding private cryptographic key in response to successful attestation of the local computing device 102. The private cryptographic key may be utilized, for example, to cryptographically sign outgoing messages of the remote computing device 106. As discussed above, a symmetric key may be utilized, in addition or alternatively to, the asymmetric cryptographic keys (e.g., using authentication encryption).

In block 606, the local computing device 102 generates a cryptographic key pair for communication with the remote computing device 106. That is, the local computing device 102 may generate a cryptographic key pair including a public cryptographic key and a private cryptographic key. In block 608, the public cryptographic key of the local computing device 102 is transmitted to the remote computing device 106 so that the remote computing device 106 may utilize that cryptographic key to verify the signature of messages transmitted by the local computing device 102 and/or to encrypt messages to be transmitted to the local computing device 102.

For ease of discussion, the cryptographic key pair generated by the local computing device 102 may be referred to herein as a "local" cryptographic key pair including a local public cryptographic key and a local private cryptographic key. And the cryptographic key pair generated by the remote computing device 106 may be referred to herein as a "remote" cryptographic key pair including a remote public cryptographic key and a remote private cryptographic key. Additionally, it should be appreciated that, in the illustrative embodiment, the local computing device 102 exchanges a separate set of cryptographic keys for each remote computing device 106 and the remote computing devices 106 do the same. For example, the cryptographic keys utilized for communication between the local computing device 102 and a first remote computing device 106 are different from the cryptographic keys utilized for communication between the local computing device 102 and a second remote computing device 106. Accordingly, in the illustrative embodiment, in reference to a particular remote computing device 106, the local private cryptographic key is used by the local computing device 102 to sign outgoing messages to the remote computing device 106. Additionally, because the remote computing device 106 utilizes the local public cryptographic key to encrypt outgoing messages to the local computing device 102, in the illustrative embodiment, the local computing device 102 also uses the local private cryptographic key to decrypt those incoming encrypted and signed messages.

The local computing device 102 also verifies the cryptographically signed communication (i.e., verifies the signature) by using the remote public cryptographic key received from the remote computing device 106. As indicated above, in order to securely exchange the cryptographic keys between the computing devices 102, 106, communication is tunneled through the appropriate message protocols (e.g., SMTP) and properly encoded (e.g., as a MIME type) depending on the particular message client 204. Additionally, in some embodiments, the local computing device 102 and/or the remote computing device 106 may utilize various key certificates to securely exchange cryptographic keys. Of course, the generated and transmitted/received cryptographic keys may be stored in the respective computing devices 102, 106 for subsequent secure communication between the corresponding trusted message modules. For example, the cryptographic keys may be stored in a manner such that they are mapped to the appropriate contact associated with the computing device 102, 106 and/or otherwise linked to the corresponding message address(es). In some embodiments, the same cryptographic keys may be utilized for communication between different message clients 204 (e.g., email and instant messaging), whereas in other embodiments, the computing devices 102, 106 may generate separate cryptographic keys depending on the particular message client 204 and/or related characteristics (e.g., depending on the particular transport protocol, message encoding, frame size, etc.).

Referring back to FIG. 3, in block 316, the local computing device 102 may securely communicate with the remote computing device 106 (i.e., the remote computing device 106 with which the local computing device 102 established a trusted relationship) at some point after establishing the trusted relationship (i.e., indicated by the "tilde" symbol). In other words, the computing devices 102, 106 may utilize the generated and exchanged cryptographic keys to securely communicate with one another by virtue of their corresponding trusted message modules. To do so, the local computing device 102 may execute the method 700 of FIG. 7 discussed below. Additionally, in block 318, the local computing device 102 may modify the message receiving address of the local computing device 102 (i.e., request the remote computing device 106 to use a different message address in the future to contact the local computing device 102) and/or modify the message address of the remote computing device 106 on the local computing device 102 (e.g., in response to a request from the remote computing device 106). It should be appreciated that the computing devices 102, 106 may securely communicate with one another in order to make such modifications (e.g., to prevent a private messaging address to be revealed to an adversary). To do so, the local computing device 102 may execute the method 800 of FIG. 8 discussed below.

Figure 7:
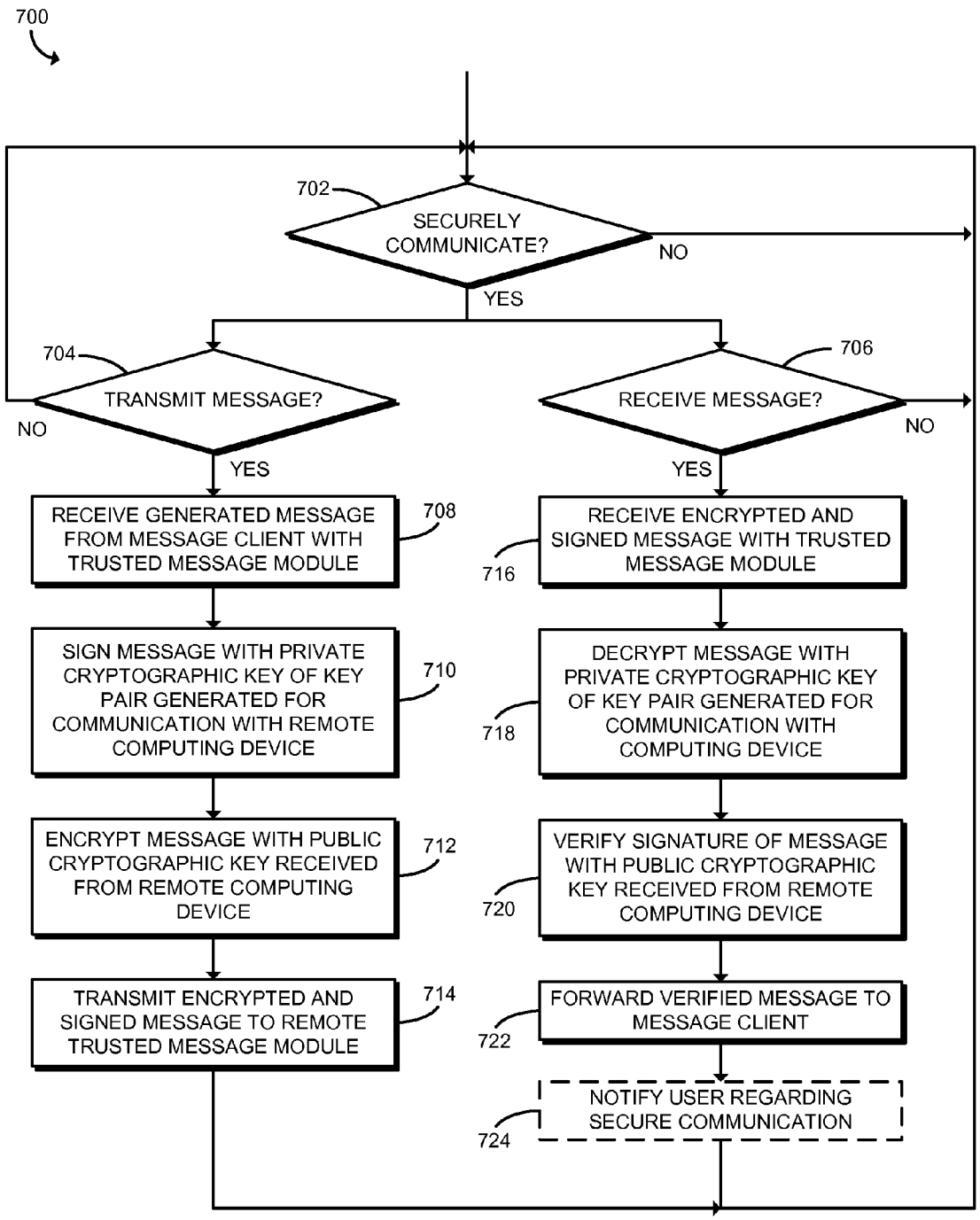
FIG. 7 is a simplified flow diagram of at least one embodiment of a method of securely communicating by the local computing device of the system of FIG. 1.

As indicated above, in order to securely communicate with a remote computing device 106 for which the local computing device 102 has established a trusted relationship, the local computing device 102 or, more particularly, the trusted message module 202 may execute the method 700 of FIG. 7. As previously discussed, instead of messages being sent directly to a corresponding message client or handler of the recipient, the messages are communicated through the corresponding trusted message modules of the communicating computing devices 102, 106. For example, in the illustrative embodiment, emails may be transmitted to the recipient's trusted message module rather than being sent directly to an SMTP server. The illustrative method 700 begins with block 702 in which the trusted message module 202 determines whether to securely communicate with the remote computing device 106 (i.e., with the corresponding trusted message module). If so, the trusted message module 202 determines whether to transmit a message in block 704 and whether to receive a message in block 706. It should be appreciated that, in the illustrative embodiment, whether the trusted message module transmits or receives a message is dictated by whether the trusted message module 202 has received an outgoing message from a message client 204 or an incoming message from a remote trusted message module.

If the trusted message module 202 determines to transmit a message, the trusted message module 202 receives a generated message from the message client 204 of the local computing device 102 in block 708 as described above. That is, rather than communicating an outgoing message directly to the remote computing device 106 or through, for example, an SMTP service in the cloud, the message is forwarded by the message client 204 to or otherwise intercepted by the trusted message module 202 for secure transmission. In some embodiments, the trusted message module 202 establishes a trustworthy binding between itself and the message clients 204. For example, the trusted message module 202 may utilize a trusted binding service in the operating system of the local computing device 102, a hypervisor-based binder, or a binding service running in the trusted execution environment 208 (e.g., in an Intel SGX enclave). By doing so, the trusted message module 202 ensures that malware executing on the local computing device 102 is inhibited from manipulating code in the trusted message module 202 to perform, for example, a man-in-the-middle attack. In some embodiments, the binding service may also associate other components of the local computing device 102 (e.g., the peripheral devices 120) and/or applications executing on the local computing device 102 that create context information with the digital relationship binding between the trusted message module 202 of the local computing device 102 and the corresponding trusted message module of the remote computing device 106. The context information may be exchanged between the devices 102, 106 at any point in time, depending on the particular embodiment.

In block 710, the trusted message module 202 cryptographically signs the message with the private cryptographic key of the cryptographic key pair generated for communication with the remote computing device 106 (e.g., the local private cryptographic key discussed above). Additionally, in block 712, the trusted message module 202 encrypts the message with the public cryptographic key received from the remote computing device 106 (e.g., the remote public cryptographic key discussed above). As discussed above, the trusted message module 202 may identify the appropriate cryptographic keys using any suitable techniques and/or mechanisms. For example, in some embodiments, the trusted message module 202 may map each message address to the appropriate cryptographic keys (i.e., if a trusted relationship has been established). It should further be appreciated that, in some embodiments, the trusted message module 202 may encrypt the message prior to signing the message. Additionally, in some embodiments, the trusted message module 202 also may generate or otherwise utilize a cryptographic key certificate for transmission to the remote computing device 106 for verification of the signature (e.g., an EPID key certificate). In block 714, the trusted message module 202 transmits the encrypted and signed message to a corresponding trusted message module of the remote computing device 106.

If the trusted message module 202 determines to receive a message, the trusted message module 202 receives an encrypted and cryptographically signed message from the corresponding trusted message module of the remote computing device 106. In other words, as discussed above, incoming messages from a trusted message module of a remote computing device 106 are directed to the trusted message module 202. In block 718, the trusted message module 202 decrypts the encrypted message with the private cryptographic key of the cryptographic key pair generated for communication with the remote computing device 106 (e.g., the local private cryptographic key discussed above). Additionally, in block 720, the trusted message module 202 verifies the signature of the message with the public cryptographic key received from the remote computing device 106 (e.g., the remote public cryptographic key discussed above). It should be appreciated that, in some embodiments, the trusted message module 202 may verify the signature of the encrypted and signed message prior to decrypting the message. In block 722, the trusted message module 202 forwards the verified message to the appropriate message client 204. That is, in the illustrative embodiment, if the message is successfully decrypted and the signature is valid, the trusted message module 202 forwards the decrypted message to the appropriate message client 204. For example, if the message is an email communication, the message is forwarded to the email client 218 of the local computing device 102. In some embodiments, the trusted message module 202 may notify the user regarding the secure communication in block 724 depending on, for example, the user's system notification preferences. For example, the trusted message module 202 may notify the user that the received message has been decrypted and verified after having been securely transmitted. Of course, the trusted message module 202 may similarly notify the user when message has been securely transmitted and/or regarding various other statuses associated with the operation of the trusted messaging technology.

Figure 8:
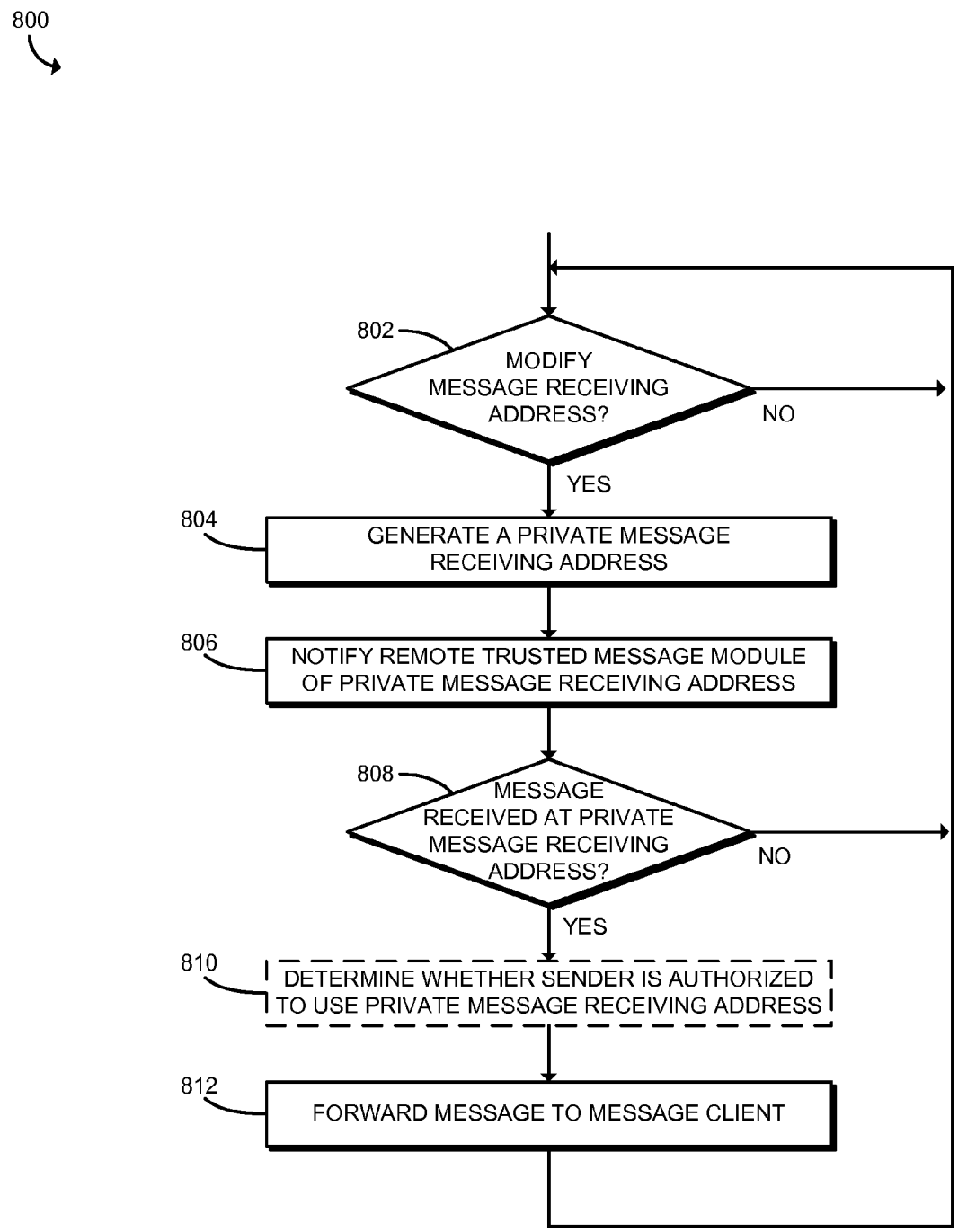
FIG. 8 is a simplified flow diagram of at least one embodiment of a method of modifying a message receiving address of the local computing device of the system of FIG. 1.

As discussed above, the local computing device 102 or, more specifically, the trusted message module 202 may modify the message receiving address of the local computing device 102 by executing the method 800 of FIG. 8. The illustrative method 800 begins with block 802 in which the local computing device 102 determines whether to modify the message receiving address of the local computing device 102. For example, in some embodiments, the local computing device 102 may provide certain remote computing devices 106 with a private message address of the local computing device 102 to ensure that the user of the local computing device 102 receives and/or reads the messages.

If the local computing device 102 determines to modify the message receiving address, the local computing device 102 generates a private message receiving address in block 804. For example, the local computing device 102 may generate a new email address at which it desires to receive subsequent email messages from a particular (or all) remote computing devices 106. It should be appreciated that the local computing device 102 may generate a private message receiving address using any suitable algorithms, techniques, and/or mechanisms. Additionally, although the message address is described herein as being generated, it should be appreciated that, in some embodiments, the local computing device 102 may select a private message receiving address from a set of pre-generated or otherwise pre-determined message addresses.

In block 806, the local computing device 102 notifies a remote computing device 106 (e.g., via the corresponding trusted message module of the remote computing device 106) of the generated private message receiving address. For example, the local computing device 102 may notify the remote computing device 106 of the new message address at which to contact the user of the local computing device 102 and indicate that the new message address will ensure that the messages are received and read. For example, the local computing device 102 may have a security policy that rejects certain messages (e.g., messages of a certain type, size, sender, frequency, etc.) received at the original message address in some embodiments. As discussed above, the remote computing device 106 may update its contact database with the new message address such that the remote trusted message module can, for example, modify the message headers of any outgoing messages directed to the local computing device 102 to reflect the private message receiving address of the local computing device 102 or otherwise ensure that the messages are sent to the right place.

In block 808, the local computing device 102 determines whether a message has been received that is directed to the private message receiving address. For example, in some embodiments, the trusted message module 202 may receive a message from a corresponding trusted message module of a remote computing device 106 and read the message header or otherwise determine that the message is directed to the generated private message receiving address. If so, the local computing device 102 may determine whether the remote computing device 106 (i.e., the sender) is authorized to use the private message receiving address to communicate with the local computing device 102 in block 810. For example, in some embodiments, the local computing device 102 maintains records of which private message receiving addresses it has generated and, for each of those message addresses, which remote computing devices 106 are authorized to communicate with the local computing device 102 through that message address. If the remote computing device 106 is not authorized to communicate via that message address, the local computing device 102 may perform any suitable error handling function (e.g., drop the message packets, notify the user of the local computing device 102 and/or the remote computing device 106, and/or perform another suitable function). However, if the remote computing device 106 is authorized to use the private message receiving address or the local computing device 102 has no such criteria, the trusted message module 202 forwards the message to the appropriate message client 204 in block 812. Of course, in some embodiments, the local computing device 102 may also modify the message receiving address of the remote computing device 106 on the local computing device 102 (e.g., in response to a request from the remote computing device 106) as described above.

EXAMPLES

Illustrative examples of the technologies disclosed herein are provided below. An embodiment of the technologies may include any one or more, and any combination of, the examples described below.

Example 1 includes a local computing device for trusted messaging, the local computing device comprising a local trusted message module, established in a trusted execution environment, to (i) perform attestation of a remote computing device based on communication with a corresponding remote trusted message module established in a trusted execution environment of the remote computing device and (ii) exchange, with the remote trusted message module, cryptographic keys in response to successful attestation of the remote computing device; and a message client to (i) forward outgoing messages to the local trusted message module and (ii) receive incoming messages from the local trusted message module, wherein, to securely transmit an outgoing message to the remote computing device, the local trusted message module is to (i) receive the outgoing message from the message client, (ii) encrypt the outgoing message, and (iii) cryptographically sign the outgoing message, prior to transmittal to the remote trusted message module of the remote computing device; and wherein, to securely receive an incoming message from the remote computing device, the local trusted message module is to (i) receive the incoming message from the remote trusted message module of the remote computing device, (ii) decrypt the incoming message, and (iii) verify a cryptographic signature of the incoming message, based on the exchanged cryptographic keys and prior to transmittal of the incoming message to the message client.

Example 2 includes the subject matter of Example 1, and wherein to perform the attestation of the remote computing device comprises to receive, from the remote trusted message module, a remote attestation quote of the corresponding trusted execution environment; and verify the remote attestation quote received from the remote trusted message module.

Example 3 includes the subject matter of any of Examples 1 and 2, and wherein the local trusted message module is further to generate a local attestation quote of the trusted execution environment of the local computing device; and transmit the generated local attestation quote for attestation of the local computing device to the remote trusted message module.

Example 4 includes the subject matter of any of Examples 1-3, and wherein to exchange the cryptographic keys comprises to receive, from the remote trusted message module, a first symmetric cryptographic key for authenticated encryption of messages transmitted to the remote computing device; generate a second symmetric cryptographic key for communication with the remote computing device; and transmit, to the remote trusted message module, the second symmetric cryptographic key for authenticated encryption of messages transmitted to the local computing device from the remote computing device.

Example 5 includes the subject matter of any of Examples 1-4, and wherein to exchange the cryptographic keys comprises to receive, from the remote trusted message module, a first public cryptographic key for encryption of messages transmitted to the remote computing device and verification of a signature of signed messages received from the remote computing device; generate a cryptographic key pair for communication with the remote computing device, the cryptographic key pair including a private cryptographic key and a second public cryptographic key; transmit, to the remote trusted message module, the second public cryptographic key for encryption of messages transmitted to the local computing device and verification of a signature of signed messages received from the local computing device.

Example 6 includes the subject matter of any of Examples 1-5, and wherein to securely transmit the outgoing message to the remote computing device comprises to receive, by the local trusted message module, a generated message from the message client; sign, by the local trusted message module, the message with the generated private cryptographic key; encrypt, by the local trusted message module, the message with the first public cryptographic key received from the remote trusted message module; and transmit, by the local trusted message module, the encrypted and signed message to the remote trusted message module.

Example 7 includes the subject matter of any of Examples 1-6, and further including to consolidate all parts of the generated message into a packaged message; wherein to sign the message comprises to sign the packaged message; and wherein to encrypt the message comprises to encrypt the packaged message.

Example 8 includes the subject matter of any of Examples 1-7, and wherein to consolidate the parts of the generated message further comprises to compress the generated message.

Example 9 includes the subject matter of any of Examples 1-8, and wherein to securely receive the incoming message from the remote computing device comprises to receive, by the local trusted message module, an encrypted and signed message from the remote trusted message module; decrypt, by the local trusted message module, the encrypted and signed message with the generated private cryptographic key; verify, by the local trusted message module, a signature of the encrypted and signed message with the first public cryptographic key received from the remote trusted message module; and forward, by the local trusted message module, the decrypted and verified message to the message client.

Example 10 includes the subject matter of any of Examples 1-9, and further including to unpackage the decrypted and verified message into constituent parts; wherein to forward the decrypted and verified message comprises to forward the constituent parts.

Example 11 includes the subject matter of any of Examples 1-10, and wherein to unpackage the decrypted and verified message further comprises to decompress the decrypted and verified message.

Example 12 includes the subject matter of any of Examples 1-11, and wherein the message client comprises one of an email client, an instant messaging client, a text messaging client, an image messaging client, a video messaging client, or an audio messaging client.

Example 13 includes the subject matter of any of Examples 1-12, and wherein the local trusted message module is further to determine whether the remote computing device has enabled the remote trusted message module; and request the remote computing device to enable the remote trusted message module in response to a determination that the remote trusted message module is not enabled.

Example 14 includes the subject matter of any of Examples 1-13, and wherein to request the remote computing device to enable the remote trusted message module comprises to provide instructions to a user of the remote computing device to install a trusted message module.

Example 15 includes the subject matter of any of Examples 1-14, and wherein the local trusted message module is further to select a contact person from a contacts database of the local computing device; construct a message to the selected contact person to request enablement of a trusted message module on a computing device of the contact person; and transmit the message to a corresponding message address of the selected contact person.

Example 16 includes the subject matter of any of Examples 1-15, and wherein to request enablement of the trusted message module comprises to provide instructions to the selected contact person to install a trusted message module on the computing device of the contact person.

Example 17 includes the subject matter of any of Examples 1-16, and wherein the local trusted message module is further to generate a private message receiving address at which to receive messages; and notify the remote trusted message module to transmit messages for the local computing device to the private message receiving address, Example 18 includes the subject matter of any of Examples 1-17, and wherein the local trusted message module is further to receive a message directed to the private message receiving address; and forward the received message to the message client.

Example 19 includes the subject matter of any of Examples 1-18, and wherein the local trusted message module is further to determine whether a sender of the message directed to the private message receiving address is authorized to use the private message receiving address, wherein to forward the received message to the message client comprises to forward the received message to the message client in response to a determination that the sender is authorized to use the private message receiving address.

Example 20 includes a method for trusted messaging, the method comprising performing, by a local trusted message module established in a trusted execution environment of a local computing device, attestation of a remote computing device based on communication with a corresponding remote trusted message module established in a trusted execution environment of the remote computing device; exchanging, by the local trusted message module and with the remote trusted message module, cryptographic keys in response to successful attestation of the remote computing device; and communicating, by the local trusted message module, with the remote trusted message module of the remote computing device, wherein communicating with the remote trusted message module comprises securely transmitting an outgoing message to the remote computing device or securely receiving an incoming message from the remote computing device, wherein securely transmitting the outgoing message comprises (i) receiving the outgoing message from a message client of the local computing device, (ii) encrypting the outgoing message, and (iii) cryptographically signing the outgoing message, prior to transmittal to the remote trusted message module of the remote computing device, and wherein securely receiving an incoming message comprises (i) receiving the incoming message from the remote trusted message module of the remote computing device, (ii) decrypting the incoming message, and (iii) verifying a cryptographic signature of the incoming message, based on the exchanged cryptographic keys and prior to transmittal of the incoming message to the message client.

Example 21 includes the subject matter of Example 20, and further including enabling, by the local computing device, the local trusted message module on the local computing device.

Example 22 includes the subject matter of any of Examples 20 and 21, and wherein performing the attestation of the remote computing device comprises receiving, by the local trusted message module and from the remote trusted message module, a remote attestation quote of the corresponding trusted execution environment; and verifying, by the local trusted message module, the remote attestation quote received from the remote trusted message module.

Example 23 includes the subject matter of any of Examples 20-22, and further including generating, by the local trusted message module, a local attestation quote of the trusted execution environment of the local computing device; and transmitting, by the local trusted message module and to the remote trusted message module, the generated local attestation quote for attestation of the local computing device.

Example 24 includes the subject matter of any of Examples 20-23, and wherein exchanging the cryptographic keys comprises receiving, by the local trusted message module and from the remote trusted message module, a first symmetric cryptographic key for authenticated encryption of messages transmitted to the remote computing device; generating, by the local trusted message module, a second symmetric cryptographic key for communication with the remote computing device; and transmitting, from the local trusted message module and to the remote trusted message module, the second symmetric cryptographic key for authenticated encryption of messages transmitted to the local computing device from the remote computing device.

Example 25 includes the subject matter of any of Examples 20-24, and wherein exchanging the cryptographic keys comprises receiving, by the local trusted message module and from the remote trusted message module, a first public cryptographic key for encrypting messages transmitted to the remote computing device and verifying a signature of signed messages received from the remote computing device; generating, by the local trusted message module, a cryptographic key pair for communication with the remote computing device, the cryptographic key pair including a private cryptographic key and a second public cryptographic key; transmitting, from the local trusted message module and to the remote trusted message module, the second public cryptographic key for encrypting messages transmitted to the local computing device and verifying a signature of signed messages received from the local computing device.

Example 26 includes the subject matter of any of Examples 20-25, and wherein securely transmitting the outgoing message to the remote computing device comprises receiving, by the local trusted message module, a generated message from the message client; signing, by the local trusted message module, the message with the generated private cryptographic key; encrypting, by the local trusted message module, the message with the first public cryptographic key received from the remote trusted message module; and transmitting, by the local trusted message module, the encrypted and signed message to the remote trusted message module.

Example 27 includes the subject matter of any of Examples 20-26, and further including consolidating all parts of the generated message into a packaged message, wherein signing the message comprises signing the packaged message; and encrypting the message comprises encrypting the packaged message.

Example 28 includes the subject matter of any of Examples 20-27, and wherein consolidating the parts of the generated message further comprises compressing the generated message.

Example 29 includes the subject matter of any of Examples 20-28, and wherein securely receiving the incoming message from the remote computing device comprises receiving, by the local trusted message module, an encrypted and signed message from the remote trusted message module; decrypting, by the local trusted message module, the encrypted and signed message with the generated private cryptographic key; verifying, by the local trusted message module, a signature of the encrypted and signed message with the first public cryptographic key received from the remote trusted message module; and forwarding, by the local trusted message module, the decrypted and verified message to the message client.

Example 30 includes the subject matter of any of Examples 20-29, and further including unpackaging the decrypted and verified message into constituent parts; wherein forwarding the decrypted and verified message comprises forwarding the constituent parts.

Example 31 includes the subject matter of any of Examples 20-30, and wherein unpackaging the decrypted and verified message further comprises decompressing the decrypted and verified message.

Example 32 includes the subject matter of any of Examples 20-31, and wherein the message client comprises one of an email client, an instant messaging client, a text messaging client, an image messaging client, a video messaging client, or an audio messaging client.

Example 33 includes the subject matter of any of Examples 20-32, and further including determining, by the local trusted message module, whether the remote computing device has enabled the remote trusted message module; and requesting, by the local trusted message module, the remote computing device to enable the remote trusted message module in response to determining the remote trusted message module is not enabled.

Example 34 includes the subject matter of any of Examples 20-33, and wherein requesting the remote computing device to enable the remote trusted message module comprises providing instructions to a user of the remote computing device to install a trusted message module.

Example 35 includes the subject matter of any of Examples 20-34, and further including selecting, by the local trusted message module, a contact person from a contacts database of the local computing device; constructing, by the local trusted message module, a message to the selected contact person to request enablement of a trusted message module on a computing device of the contact person; and transmitting, by the local trusted message module, the message to a corresponding message address of the selected contact person.

Example 36 includes the subject matter of any of Examples 20-35, and wherein requesting enablement of the trusted message module comprises providing instructions to the selected contact person to install a trusted message module on the computing device of the contact person.

Example 37 includes the subject matter of any of Examples 20-36, and further including generating, by the local trusted message module, a private message receiving address at which to receive messages; and notifying, by the local trusted message module, the remote trusted message module to transmit messages for the local computing device to the private message receiving address, Example 38 includes the subject matter of any of Examples 20-37, and further including receiving, by the local trusted message module, a message directed to the private message receiving address; and forwarding, by the local trusted message module, the received message to the message client.

Example 39 includes the subject matter of any of Examples 20-38, and further including determining, by the local trusted message module, whether a sender of the message directed to the private message receiving address is authorized to use the private message receiving address, wherein forwarding the received message to the message client comprises forwarding the received message to the message client in response to determining the sender is authorized to use the private message receiving address.

Example 40 includes a computing device comprising a processor; and a memory having stored therein a plurality of instructions that when executed by the processor cause the computing device to perform the method of any of Examples 20-39.

Example 41 includes one or more machine-readable storage media comprising a plurality of instructions stored thereon that, in response to execution by a computing device, cause the computing device to perform the method of any of Examples 20-39.

Example 42 includes a local computing device for trusted messaging, the local computing device comprising means for performing, by a local trusted message module established in a trusted execution environment of the local computing device, attestation of a remote computing device based on communication with a corresponding remote trusted message module established in a trusted execution environment of the remote computing device; means for exchanging, by the local trusted message module and with the remote trusted message module, cryptographic keys in response to successful attestation of the remote computing device; and means for communicating, by the local trusted message module, with the remote trusted message module of the remote computing device, wherein the means for communicating with the remote trusted message module comprises means for securely transmitting an outgoing message to the remote computing device or means for securely receiving an incoming message from the remote computing device, wherein the means for securely transmitting the outgoing message comprises (i) means for receiving the outgoing message from a message client of the local computing device, (ii) means for encrypting the outgoing message, and (iii) means for cryptographically signing the outgoing message, prior to transmittal to the remote trusted message module of the remote computing device, and wherein the means for securely receiving an incoming message comprises (i) means for receiving the incoming message from the remote trusted message module of the remote computing device, (ii) means for decrypting the incoming message, and (iii) means for verifying a cryptographic signature of the incoming message, based on the exchanged cryptographic keys and prior to transmittal of the incoming message to the message client Example 43 includes the subject matter of Example 42, and further including means for enabling the local trusted message module on the local computing device.

Example 44 includes the subject matter of any of Examples 42 and 43, and wherein the means for performing the attestation of the remote computing device comprises means for receiving, by the local trusted message module and from the remote trusted message module, a remote attestation quote of the corresponding trusted execution environment; and means for verifying, by the local trusted message module, the remote attestation quote received from the remote trusted message module.

Example 45 includes the subject matter of any of Examples 42-44, and further including means for generating, by the local trusted message module, a local attestation quote of the trusted execution environment of the local computing device; and means for transmitting, by the local trusted message module and to the remote trusted message module, the generated local attestation quote for attestation of the local computing device.

Example 46 includes the subject matter of any of Examples 42-45, and wherein the means for exchanging the cryptographic keys comprises means for receiving, by the local trusted message module and from the remote trusted message module, a first symmetric cryptographic key for authenticated encryption of messages transmitted to the remote computing device; means for generating, by the local trusted message module, a second symmetric cryptographic key for communication with the remote computing device; and means for transmitting, from the local trusted message module and to the remote trusted message module, the second symmetric cryptographic key for authenticated encryption of messages transmitted to the local computing device from the remote computing device.

Example 47 includes the subject matter of any of Examples 42-46, and wherein the means for exchanging the cryptographic keys comprises means for receiving, by the local trusted message module and from the remote trusted message module, a first public cryptographic key for encrypting messages transmitted to the remote computing device and verifying a signature of signed messages received from the remote computing device; means for generating, by the local trusted message module, a cryptographic key pair for communication with the remote computing device, the cryptographic key pair including a private cryptographic key and a second public cryptographic key; means for transmitting, from the local trusted message module and to the remote trusted message module, the second public cryptographic key for encrypting messages transmitted to the local computing device and verifying a signature of signed messages received from the local computing device.

Example 48 includes the subject matter of any of Examples 42-47, and wherein the means for securely transmitting the outgoing message to the remote computing device comprises means for receiving, by the local trusted message module, a generated message from the message client; means for signing, by the local trusted message module, the message with the generated private cryptographic key; means for encrypting, by the local trusted message module, the message with the first public cryptographic key received from the remote trusted message module; and means for transmitting, by the local trusted message module, the encrypted and signed message to the remote trusted message module.

Example 49 includes the subject matter of any of Examples 42-48, and further including means for consolidating all parts of the generated message into a packaged message, wherein the means for signing the message comprises means for signing the packaged message; and the means for encrypting the message comprises means for encrypting the packaged message.

Example 50 includes the subject matter of any of Examples 42-49, and wherein the means for consolidating the parts of the generated message further comprises means for compressing the generated message.

Example 51 includes the subject matter of any of Examples 42-50, and wherein the means for securely receiving the incoming message from the remote computing device comprises means for receiving, by the local trusted message module, an encrypted and signed message from the remote trusted message module; means for decrypting, by the local trusted message module, the encrypted and signed message with the generated private cryptographic key; means for verifying, by the local trusted message module, a signature of the encrypted and signed message with the first public cryptographic key received from the remote trusted message module; and means for forwarding, by the local trusted message module, the decrypted and verified message to the message client.

Example 52 includes the subject matter of any of Examples 42-51, and further including means for unpackaging the decrypted and verified message into constituent parts; wherein the means for forwarding the decrypted and verified message comprises means for forwarding the constituent parts.

Example 53 includes the subject matter of any of Examples 42-52, and wherein the means for unpackaging the decrypted and verified message further comprises means for decompressing the decrypted and verified message.

Example 54 includes the subject matter of any of Examples 42-53, and wherein the message client comprises one of an email client, an instant messaging client, a text messaging client, an image messaging client, a video messaging client, or an audio messaging client.

Example 55 includes the subject matter of any of Examples 42-54, and further comprising means for determining, by the local trusted message module, whether the remote computing device has enabled the remote trusted message module; and means for requesting, by the local trusted message module, the remote computing device to enable the remote trusted message module in response to a determination that the remote trusted message module is not enabled.

Example 56 includes the subject matter of any of Examples 42-55, and wherein the means for requesting the remote computing device to enable the remote trusted message module comprises means for providing instructions to a user of the remote computing device to install a trusted message module.

Example 57 includes the subject matter of any of Examples 42-56, and further including means for selecting, by the local trusted message module, a contact person from a contacts database of the local computing device; means for constructing, by the local trusted message module, a message to the selected contact person to request enablement of a trusted message module on a computing device of the contact person; and means for transmitting, by the local trusted message module, the message to a corresponding message address of the selected contact person.

Example 58 includes the subject matter of any of Examples 42-57, and wherein the means for requesting enablement of the trusted message module comprises means for providing instructions to the selected contact person to install a trusted message module on the computing device of the contact person.

Example 59 includes the subject matter of any of Examples 42-58, and further including means for generating, by the local trusted message module, a private message receiving address at which to receive messages; and means for notifying, by the local trusted message module, the remote trusted message module to transmit messages for the local computing device to the private message receiving address, Example 60 includes the subject matter of any of Examples 42-59, and further including means for receiving, by the local trusted message module, a message directed to the private message receiving address; and means for forwarding, by the local trusted message module, the received message to the message client.

Example 61 includes the subject matter of any of Examples 42-60, and further including means for determining, by the local trusted message module, whether a sender of the message directed to the private message receiving address is authorized to use the private message receiving address, wherein the means for forwarding the received message to the message client comprises means for forwarding the received message to the message client in response to a determination that the sender is authorized to use the private message receiving address.

The invention claimed is:

1. A local computing device for trusted messaging, the local computing device comprising:
   a processor;
   a local trusted message module, established in a trusted execution environment, to (i) perform attestation of a remote computing device based on communication with a corresponding remote trusted message module established in a trusted execution environment of the remote computing device and (ii) exchange, with the remote trusted message module, cryptographic keys in response to successful attestation of the remote computing device; and
   a message client to (i) forward outgoing messages to the local trusted message module and (ii) receive incoming messages from the local trusted message module,
   wherein, to securely transmit an outgoing message to the remote computing device, the local trusted message module is to (i) receive the outgoing message from the message client, (ii) encrypt the outgoing message, and (iii) cryptographically sign the outgoing message, prior to transmittal to the remote trusted message module of the remote computing device; and
   wherein, to securely receive an incoming message from the remote computing device, the local trusted message module is to (i) receive the incoming message from the remote trusted message module of the remote computing device, (ii) decrypt the incoming message, and (iii) verify a cryptographic signature of the incoming message, based on the exchanged cryptographic keys and prior to transmittal of the incoming message to the message client.

2. The local computing device of claim 1, wherein to perform the attestation of the remote computing device comprises to:
   receive, from the remote trusted message module, a remote attestation quote of the corresponding trusted execution environment; and verify the remote attestation quote received from the remote trusted message module.

3. The local computing device of claim 2, wherein the local trusted message module is further to:
generate a local attestation quote of the trusted execution environment of the local computing device; and
transmit the generated local attestation quote for attestation of the local computing device to the remote trusted message module.

4. The local computing device of claim 3, wherein to exchange the cryptographic keys comprises to:
receive, from the remote trusted message module, a first symmetric cryptographic key for authenticated encryption of messages transmitted to the remote computing device;
generate a second symmetric cryptographic key for communication with the remote computing device; and
transmit, to the remote trusted message module, the second symmetric cryptographic key for authenticated encryption of messages transmitted to the local computing device from the remote computing device.

5. The local computing device of claim 3, wherein to exchange the cryptographic keys comprises to:
receive, from the remote trusted message module, a first public cryptographic key for encryption of messages transmitted to the remote computing device and verification of a signature of signed messages received from the remote computing device;
generate a cryptographic key pair for communication with the remote computing device, the cryptographic key pair including a private cryptographic key and a second public cryptographic key;
transmit, to the remote trusted message module, the second public cryptographic key for encryption of messages transmitted to the local computing device and verification of a signature of signed messages received from the local computing device.

6. The local computing device of claim 5, wherein to securely transmit the outgoing message to the remote computing device comprises to:
receive, by the local trusted message module, a generated message from the message client;
sign, by the local trusted message module, the message with the generated private cryptographic key;
encrypt, by the local trusted message module, the message with the first public cryptographic key received from the remote trusted message module; and
transmit, by the local trusted message module, the encrypted and signed message to the remote trusted message module.

7. The local computing device of claim 5, wherein to securely receive the incoming message from the remote computing device comprises to:
receive, by the local trusted message module, an encrypted and signed message from the remote trusted message module;
decrypt, by the local trusted message module, the encrypted and signed message with the generated private cryptographic key;
verify, by the local trusted message module, a signature of the encrypted and signed message with the first public cryptographic key received from the remote trusted message module; and
forward, by the local trusted message module, the decrypted and verified message to the message client.

8. The local computing device of claim 1, wherein the local trusted message module is further to:

determine whether the remote computing device has enabled the remote trusted message module; and
request the remote computing device to enable the remote trusted message module in response to a determination that the remote trusted message module is not enabled.

9. The local computing device of claim 8, wherein to request the remote computing device to enable the remote trusted message module comprises to provide instructions to a user of the remote computing device to install a trusted message module.

10. The local computing device of claim 1, wherein the local trusted message module is further to:
select a contact person from a contacts database of the local computing device;
construct a message to the selected contact person to request enablement of a trusted message module on a computing device of the contact person; and
transmit the message to a corresponding message address of the selected contact person.

11. The local computing device of claim 10, wherein to request enablement of the trusted message module comprises to provide instructions to the selected contact person to install the trusted message module on the computing device of the contact person.

12. The local computing device of claim 1, wherein the local trusted message module is further to:
generate a private message receiving address at which to receive messages; and
notify the remote trusted message module to transmit messages for the local computing device to the private message receiving address.

13. The local computing device of claim 12, wherein the local trusted message module is further to:
receive a message directed to the private message receiving address; and
forward the received message to the message client.

14. The local computing device of claim 13, wherein the local trusted message module is further to determine whether a sender of the message directed to the private message receiving address is authorized to use the private message receiving address,
wherein to forward the received message to the message client comprises to forward the received message to the message client in response to a determination that the sender is authorized to use the private message receiving address.

15. The local computing device of any of claims 1-14, wherein the message client comprises one of an email client, an instant messaging client, a text messaging client, an image messaging client, a video messaging client, or an audio messaging client.

16. One or more non-transitory machine-readable storage media comprising a plurality of instructions stored thereon that, in response to execution by a local computing device, cause the local computing device to:
perform, by a local trusted message module established in a trusted execution environment of the local computing device, attestation of a remote computing device based on communication with a corresponding remote trusted message module established in a trusted execution environment of the remote computing device;
exchange, by the local trusted message module and with the remote trusted message module, cryptographic keys in response to successful attestation of the remote computing device; and
communicate, by the local trusted message module, with the remote trusted message module of the remote computing device, wherein to communicate with the remote trusted message module comprises to securely transmit an outgoing message to the remote computing device or securely receive an incoming message from the remote computing device, wherein to securely transmit the outgoing message comprises to (i) receive the outgoing message from a message client of the local computing device, (ii) encrypt the outgoing message, and (iii) cryptographically sign the outgoing message, prior to transmittal to the remote trusted message module of the remote computing device, and wherein to securely receive an incoming message comprises to (i) receive the incoming message from the remote trusted message module of the remote computing device, (ii) decrypt the incoming message, and (iii) verify a cryptographic signature of the incoming message, based on the exchanged cryptographic keys and prior to transmittal of the incoming message to the message client.

17. The one or more non-transitory machine-readable storage media of claim 16, wherein to perform the attestation of the remote computing device comprises to:

receive, by the local trusted message module and from the remote trusted message module, a remote attestation quote of the corresponding trusted execution environment; and verify, by the local trusted message module, the remote attestation quote received from the remote trusted message module.

18. The one or more non-transitory machine-readable storage media of claim 17, wherein the plurality of instructions further cause the local computing device to:

generate, by the local trusted message module, a local attestation quote of the trusted execution environment of the local computing device; and transmit, by the local trusted message module and to the remote trusted message module, the generated local attestation quote for attestation of the local computing device.

19. The one or more non-transitory machine-readable storage media of claim 18, wherein to exchange the cryptographic keys comprises to:

receive, by the local trusted message module and from the remote trusted message module, a first public cryptographic key for encrypting messages transmitted to the remote computing device and verifying a signature of signed messages received from the remote computing device;

generate, by the local trusted message module, a cryptographic key pair for communication with the remote computing device, the cryptographic key pair including a private cryptographic key and a second public cryptographic key; and transmit, from the local trusted message module and to the remote trusted message module, the second public cryptographic key for encrypting messages transmitted to the local computing device and verifying a signature of signed messages received from the local computing device.

20. The one or more non-transitory machine-readable storage media of claim 19, wherein to securely transmit the outgoing message to the remote computing device comprises to:

receive, by the local trusted message module, a generated message from the message client;

sign, by the local trusted message module, the message with the generated private cryptographic key;

encrypt, by the local trusted message module, the message with the first public cryptographic key received from the remote trusted message module; and transmit, by the local trusted message module, the encrypted and signed message to the remote trusted message module.

21. The one or more non-transitory machine-readable storage media of claim 19, wherein to securely receive the incoming message from the remote computing device comprises to:

receive, by the local trusted message module, an encrypted and signed message from the remote trusted message module;

decrypt, by the local trusted message module, the encrypted and signed message with the generated private cryptographic key;

verify, by the local trusted message module, a signature of the encrypted and signed message with the first public cryptographic key received from the remote trusted message module; and forward, by the local trusted message module, the decrypted and verified message to the message client.

22. The one or more non-transitory machine-readable storage media of claim 16, wherein the plurality of instructions further cause the computing device to:

select, by the local trusted message module, a contact person from a contacts database of the local computing device;

construct, by the local trusted message module, a message to the selected contact person to request enablement of a trusted message module on a computing device of the contact person; and transmit, by the local trusted message module, the message to a corresponding message address of the selected contact person.

23. A method for trusted messaging, the method comprising:

performing, by a local trusted message module established in a trusted execution environment of a local computing device, attestation of a remote computing device based on communication with a corresponding remote trusted message module established in a trusted execution environment of the remote computing device;

exchanging, by the local trusted message module and with the remote trusted message module, cryptographic keys in response to successful attestation of the remote computing device; and communicating, by the local trusted message module, with the remote trusted message module of the remote computing device, wherein communicating with the remote trusted message module comprises securely transmitting an outgoing message to the remote computing device or securely receiving an incoming message from the remote computing device, wherein securely transmitting the outgoing message comprises (i) receiving the outgoing message from a message client of the local computing device, (ii) encrypting the outgoing message, and (iii) cryptographically signing the outgoing message, prior to transmittal to the remote trusted message module of the remote computing device, and wherein securely receiving an incoming message comprises (i) receiving the incoming message from the remote trusted message module of the remote computing device, (ii) decrypting the incoming message, and (iii) verifying a cryptographic signature of the incoming message, based on the exchanged cryptographic keys and prior to transmittal of the incoming message to the message client.

24. The method of claim 23, wherein performing the attestation of the remote computing device comprises:
receiving, by the local trusted message module and from the remote trusted message module, a remote attestation quote of the corresponding trusted execution environment; and
verifying, by the local trusted message module, the remote attestation quote received from the remote trusted message module.

25. The method of claim 24, further comprising:
generating, by the local trusted message module, a local attestation quote of the trusted execution environment of the local computing device; and
transmitting, by the local trusted message module and to the remote trusted message module, the generated local attestation quote for attestation of the local computing device, wherein exchanging the cryptographic keys comprises:
receiving, by the local trusted message module and from the remote trusted message module, a first public cryptographic key for encrypting messages transmitted to the remote computing device and verifying a signature of signed messages received from the remote computing device;
generating, by the local trusted message module, a cryptographic key pair for communication with the remote computing device, the cryptographic key pair including a private cryptographic key and a second public cryptographic key;
transmitting, from the local trusted message module and to the remote trusted message module, the second public cryptographic key for encrypting messages transmitted to the local computing device and verifying a signature of signed messages received from the local computing device.

* * * * *